US009407906B2

(12) United States Patent
Kroon

(10) Patent No.: US 9,407,906 B2
(45) Date of Patent: Aug. 2, 2016

(54) AUTOSTEREOSCOPIC DISPLAY DEVICE AND DRIVING METHOD

(71) Applicant: KONINKLIJKE PHILIPS N.V., Eindhoven (NL)

(72) Inventor: Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/402,356

(22) PCT Filed: May 23, 2013

(86) PCT No.: PCT/IB2013/054263
§ 371 (c)(1),
(2) Date: Nov. 20, 2014

(87) PCT Pub. No.: WO2013/179190
PCT Pub. Date: Dec. 5, 2013

(65) Prior Publication Data
US 2015/0138457 A1 May 21, 2015

Related U.S. Application Data

(60) Provisional application No. 61/654,187, filed on Jun. 1, 2012.

(51) Int. Cl.
*G02B 27/26* (2006.01)
*G02B 27/22* (2006.01)
*H04N 13/04* (2006.01)

(52) U.S. Cl.
CPC ........ *H04N 13/0447* (2013.01); *G02B 27/2214* (2013.01); *G02B 27/26* (2013.01); *H04N 13/0404* (2013.01); *H04N 2013/0465* (2013.01)

(58) Field of Classification Search
CPC .............. H04N 2013/0465; H04N 2013/0461; H04N 13/0445–13/0447; H04N 13/0404; G02B 27/22; G02B 27/2214; G02B 27/26; G09G 2320/068
USPC ................ 349/15, 57, 95; 359/462, 463, 445, 359/489.14, 489.18, 581, 619, 722; 348/51; 353/7, 8; 345/419, 6
See application file for complete search history.

(56) References Cited

U.S. PATENT DOCUMENTS

| 5,852,512 | A   |   | 12/1998 | Chikazawa |             |
|-----------|-----|---|---------|-----------|-------------|
| 5,956,001 | A   | * | 9/1999  | Sumida    | G02B 27/2214 |
|           |     |   |         |           | 345/55      |
| 6,069,650 | A   |   | 5/2000  | Battersby |             |
| 6,703,989 | B1  | * | 3/2004  | Harrold   | G02B 27/2214 |
|           |     |   |         |           | 345/32      |

(Continued)

FOREIGN PATENT DOCUMENTS

| WO | 2006015562 A1 | 2/2006 |
| WO | 2007072289 A2 | 6/2007 |

(Continued)

*Primary Examiner* — Michael Caley
*Assistant Examiner* — Jia Pan

(57) ABSTRACT

The invention provides an autostereoscopic display device in which a light blocking arrangement is provided for selectively blocking light which has or would pass between lenses. Elements are provided between adjacent lens locations, and the display can be configured so that light reaching these elements is either allowed to reach the viewer or is blocked from reaching the viewer. This means that a public (multiple cone) viewing mode can be chosen or a private (single narrow viewing cone) viewing mode.

7 Claims, 10 Drawing Sheets

(56) References Cited

U.S. PATENT DOCUMENTS

| | | | | |
|---|---|---|---|---|
| 7,646,438 B2 * | 1/2010 | Park | | G02B 3/005 349/15 |
| 7,782,534 B1 * | 8/2010 | Booyens | | B41M 3/003 359/619 |
| 8,885,018 B2 * | 11/2014 | Smith | | G02B 27/2214 345/32 |
| 2006/0245060 A1 * | 11/2006 | Goto | | G02B 5/003 359/613 |
| 2007/0247590 A1 | 10/2007 | Schwerdtner | | |
| 2009/0201461 A1 * | 8/2009 | Kosa | | G02F 1/13452 351/159.39 |
| 2009/0251660 A1 | 10/2009 | Figler et al. | | |
| 2009/0262419 A1 * | 10/2009 | Robinson | | G02B 3/0012 359/463 |
| 2010/0172016 A1 * | 7/2010 | Park | | G02F 1/167 359/296 |
| 2010/0328440 A1 * | 12/2010 | Willemsen | | G02B 27/2214 348/59 |
| 2011/0018860 A1 * | 1/2011 | Parry-Jones | | G09G 3/20 345/214 |
| 2011/0157264 A1 * | 6/2011 | Seshadri | | G06F 3/14 345/698 |
| 2011/0159929 A1 | 6/2011 | Karaoguz | | |
| 2011/0234605 A1 | 9/2011 | Smith | | |
| 2012/0162763 A1 * | 6/2012 | Son | | G02B 27/2214 359/463 |

FOREIGN PATENT DOCUMENTS

| | | |
|---|---|---|
| WO | 2007072330 A1 | 6/2007 |
| WO | 2007129819 A1 | 11/2007 |
| WO | 2008032248 A1 | 3/2008 |
| WO | 2009147588 A1 | 12/2009 |
| WO | 2012164425 A1 | 12/2012 |

* cited by examiner

AUTOSTEREOSCOPIC DISPLAY DEVICE AND DRIVING METHOD

CROSS-REFERENCE TO PRIOR APPLICATION

This application is the U.S. National Phase application under 35 U.S.C. §371 of International Application No. PCT/IB2013/054263, filed on May 23, 2013, which claims the benefit of U.S. Provisional Patent Application No. 61/654,187, filed on Jun. 1, 2012. These applications are hereby incorporated by reference herein.

FIELD OF THE INVENTION

This invention relates to an autostereoscopic display device of the type that comprises a display panel having an array of display pixels for producing a display and an imaging arrangement for directing different views to different spatial positions.

BACKGROUND OF THE INVENTION

A first example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

A drawback of this type of two-view display design is that the viewer has to be at a fixed position, and can only move approximately 3 cm to the left or right. In a more preferred embodiment there are not two sub-pixel columns beneath each slit, but several. In this way, the viewer is allowed to move to the left and right and perceives a stereo image in his/her eyes all the time.

The barrier arrangement is simple to produce but is not light efficient. A preferred alternative is therefore to use a lens arrangement as the imaging arrangement. For example, an array of elongate lenticular elements can be provided extending parallel to one another and overlying the display pixel array, and the display pixels are observed through these lenticular elements.

The lenticular elements are provided as a sheet of elements, each of which comprises an elongate semi-cylindrical lens element. The lenticular elements extend generally in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image. The sheet of lenticular elements thus provides a light output directing function.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right, a series of successive, different, stereoscopic views are perceived creating, for example, a look-around impression.

Increasing the number of views improves the 3D impression but reduces the image resolution as perceived by the viewer, since all views are displayed at the same time by the native display. A compromise is typically found whereby a number of views (such as 9 or 15) are displayed in so-called viewing cones, and these viewing cones repeat across the field of view. The end result is a display with a large viewing angle, although viewers are not entirely free in choosing their location from which to view the 3D monitor or television: at the boundaries between viewing cones the 3D effect is absent and ghost images appear. This wide viewing angle is a problem in situations where the user of the display would prefer no eavesdropping on all or certain parts of the display content. One typical example is reading of mail and documents during commutes. It has been proposed to provide a display with private and public viewing modes. This has also been proposed for 3D autostereoscopic displays, for example in US-2011/0234605. This document discloses that different modes can be created by driving different arrangements of sub-pixels.

SUMMARY OF THE INVENTION

According to the invention, there is provided a display and method as defined in the independent claims.

In one aspect, the invention provides an autostereoscopic display device comprising:
  a display panel;
  an array of lenses arranged in front of the display panel; and
  a light blocking arrangement for selectively blocking light which is directed between the lenses, wherein the light blocking arrangement comprises elements provided between adjacent lens locations;
wherein the display is configurable in at least two different modes: a first privacy mode in which the light blocking arrangement blocks light which is directed between the lenses; and a second public mode in which the light blocking arrangement does not block the light which is directed between the lenses.

By "directed between the lenses" is meant light that has a direction which passes from one lens to an adjacent lens before reaching the lens output.

The invention thus provides a lens-based autostereoscopic display device, in which a switchable privacy mode is able to turn on and off cone repetition. With cone repetition, the display functions exactly like a regular lens-based autostereoscopic display. Without cone repetition (because of the blocking function between lenses), the viewing angle is limited to one cone. The opening angle of the single viewing cone is a lens design choice based on the relation between the lens pitch and sheet thickness.

An advantage of this approach is that even in the privacy mode, the output brightness to the desired viewing cone is not reduced, and the full display resolution is used.

The setting of the configuration can be based on input received from the user, for example via a switch (either physical such as a laptop key, or in software) to switch between the two states. A "privacy mode" can be allocated to applications that run on the device, such that when at least one application that has this privacy mode is run, the viewing angle is limited to a single cone.

The elements between the lenses can be the elements that perform the light blocking, or else they can process the light (such as change the polarization) to be blocked by a further optical element.

In one arrangement, the light blocking arrangement can comprise a switchable retarder arrangement for altering a light polarization and a polarizer arrangement for blocking at least one polarization.

In one implementation, the elements provided between the adjacent lenses comprise the polarizer arrangement, and the switchable retarder arrangement is provided before the lens array. In this way, by choosing whether or not to switch the polarization using the retarder, the polarizer elements between the lenses will either perform an absorbing or transmitting function.

The switchable retarder arrangement can be pixellated (as a passive or active matrix), to enable a locally set switchable privacy mode. In this case, the device can operate such that the privacy mode is set locally in a way that is clear and convenient to the user. One specific solution targeted at graphical user interfaces is to embed application privacy modes into GUI elements.

The switchable retarder arrangement can instead comprise a single switchable component.

The light blocking arrangement can further comprise a second polarizer arrangement, with the switchable retarder arrangement provided between the two polarizer arrangements. The second polarizer arrangement is for example only needed if the display panel output is randomly polarized.

In an alternative arrangement, the elements provided between the adjacent lenses comprise the switchable retarder arrangement, and the polarizer arrangement is provided after the lens array (by "after" is meant further along the optical path output from the display panel).

In this case, the elements between the lenses do not perform the light blocking
this is implemented by the subsequent polarizer arrangement.

The light blocking arrangement can again further comprise a second polarizer arrangement, with the switchable retarder arrangement provided between (by "between" is again with reference to the optical path) the two polarizer arrangements.

In all examples outlined above, there is a switchable retarder followed by a polarizer, for the light which has passed between lenses, i.e. light passing in a wide viewing angle direction. For light passing normally from the display, there is a path through only one of the two components (which may be the retarder or the polarizer depending on the configuration) so that the polarization-dependent light blocking is not implemented.

In another set of examples, the elements provided between adjacent lenses comprise switchable components which are switchable between light blocking and light transmissive modes. In this way, an optical element between each two neighbouring lenses is switchable between a transmissive and absorbent state. The elements can for example each comprise an electrophoretic cell.

The display panel can comprise a liquid crystal display or a light emissive display.

The array of lenses can comprise a curved lens portion, wherein:
  the curved lens portion faces away from the display panel and the elements are in the lens beneath the curved lens portion; or
  the curved lens portion faces towards the display panel with a replica structure between the lens portion and the display panel, and the elements are in the replica structure. Thus the lenses can be concave or convex as viewed from the display panel.

In another aspect, the invention provides a method of operating an autostereoscopic display device which comprises a display panel and an array of lenses arranged in front of the display panel, and a light blocking arrangement for selectively blocking light which is directed between the lenses, wherein the light blocking arrangement comprises elements provided between adjacent lens locations;
wherein the method comprises configuring the display in one of at least two different modes: a first privacy mode in which the light blocking arrangement blocks light which is directed between the lenses; and a second public mode in which the light blocking arrangement does not block light which is directed between the lenses.

BRIEF DESCRIPTION OF THE DRAWINGS

An embodiment of the invention will now be described, purely by way of example, with reference to the accompanying drawings, in which.

DETAILED DESCRIPTION OF THE EMBODIMENTS

The invention provides an autostereoscopic display device in which a light blocking arrangement is provided for selectively blocking light which has or would pass between adjacent lenses due to the large lateral (i.e. non-normal) angle of propagation. Elements are provided between adjacent lens locations, and the display can be configured so that light reaching these elements is either allowed to reach the viewer or is blocked from reaching the viewer. This means that a public (multiple cone) viewing mode can be chosen or a private (single narrow viewing cone) viewing mode.

Figure 1:
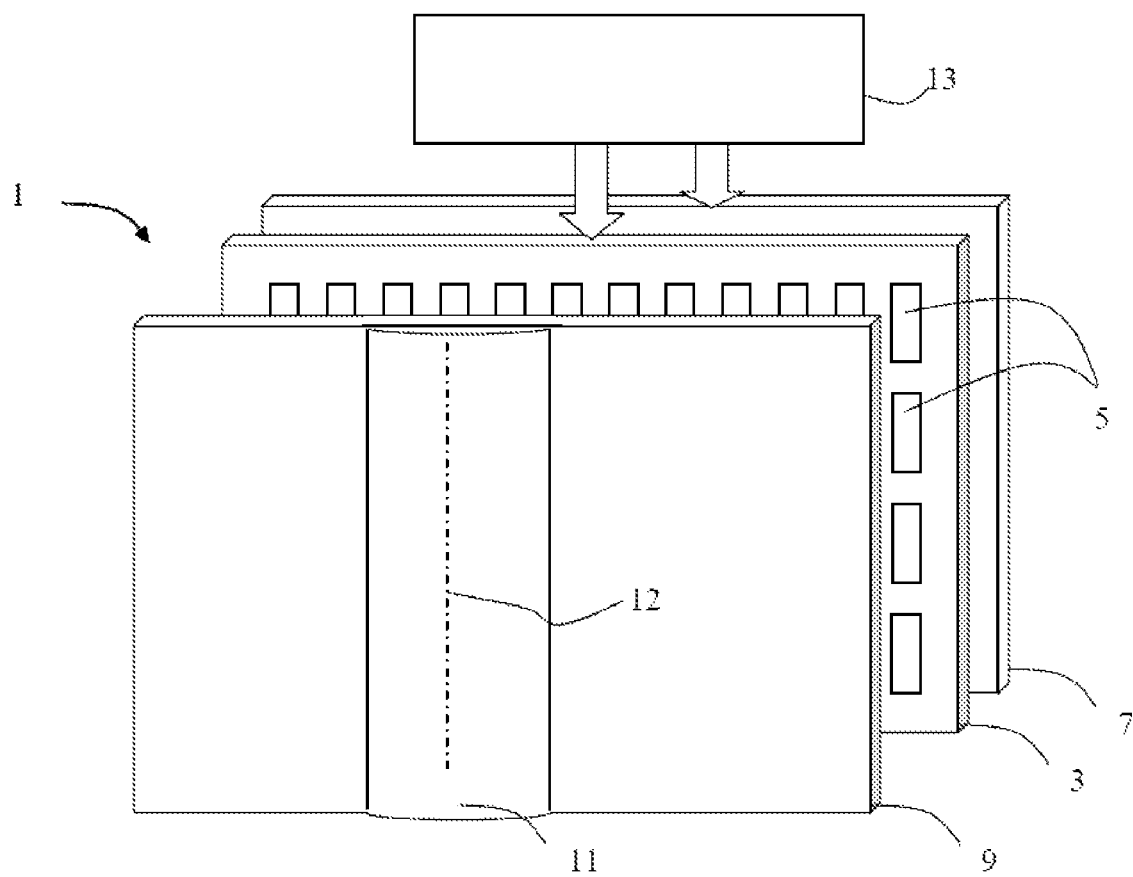
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Fig.. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The device has a controller 13 which controls the backlight and the display panel.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

The skilled person will appreciate that a light polarising means must be used in conjunction with the above described array, since the liquid crystal material is birefringent, with the refractive index switching only applying to light of a particular polarisation. The light polarising means may be provided as part of the display panel or the imaging arrangement of the device.

Figure 2:
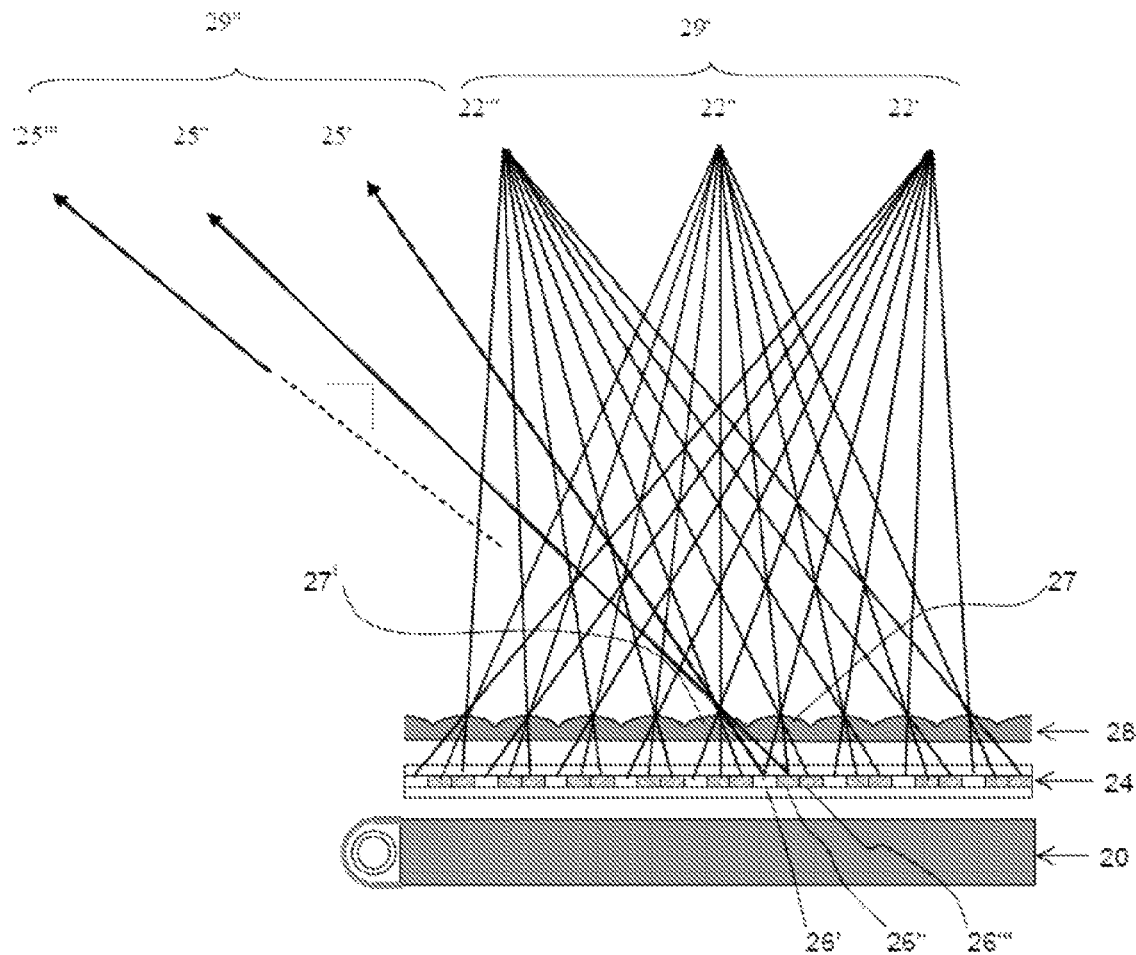
FIG. 2 shows how a lenticular array provides different views to different spatial locations.

FIG. 2 shows the principle of operation of a lenticular type imaging arrangement as described above and shows the backlight 20, display device 24 such as an LCD and the lenticular array 28 of lenses 27. FIG. 2 shows how the lenticular arrangement 28 directs different pixel outputs to three different spatial locations.

This invention relates to view repetition in such displays, which is explained below.

Figure 3:
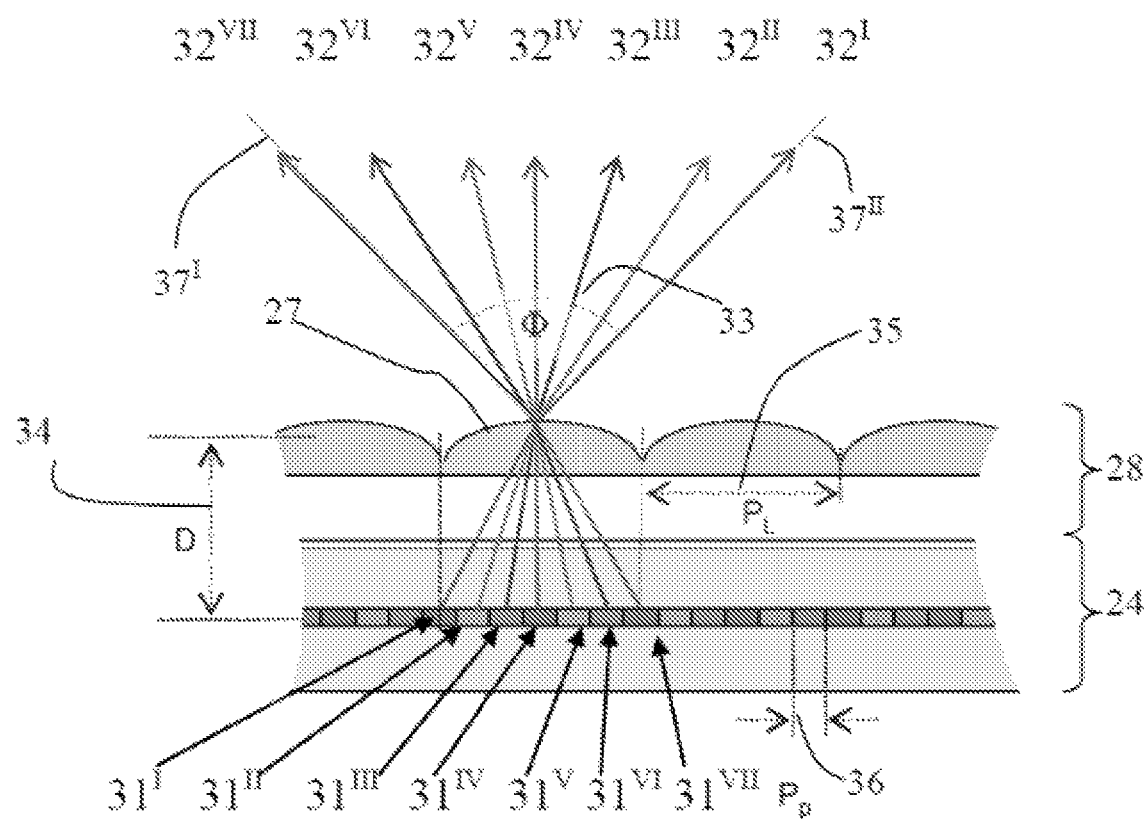
FIG. 3 shows a cross-section of the layout of a multi-view auto-stereoscopic display.

FIG. 3 shows a cross-section of the layout of a multi-view auto-stereoscopic display. Each pixel $31^{I}$ to $31^{VIII}$ underneath a certain lenticular lens 27 will contribute to a specific view $32^{I}$ to $32^{VII}$. All pixels underneath this lens will together contribute to a cone of views. The width of this cone (between lines $37^{I}$ and $37^{II}$) is determined by the combination of several parameters: it depends on the distance 34 (D) from the pixel plane to the plane of the lenticular lenses. It also depends on the lens pitch 35 ($P_L$).

Figure 4:
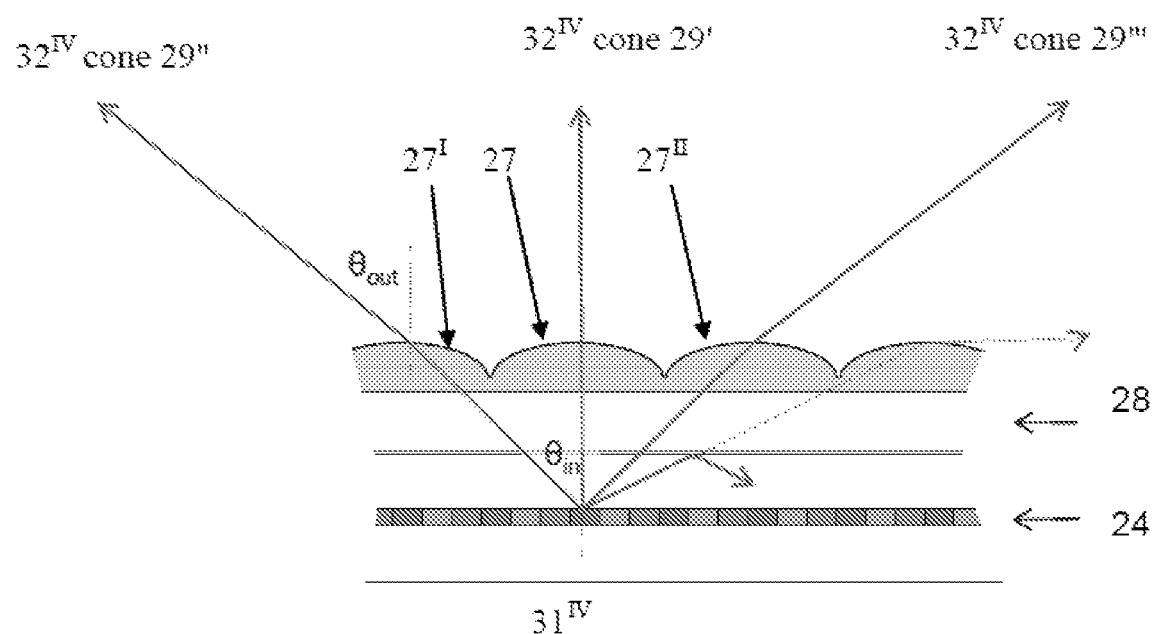
FIG. 4 is a close-up of FIG. 3.

FIG. 4 is a close-up of FIG. 3, and shows that the light emitted (or modulated) by a pixel of the display 24 is collected by the lenticular lens 27 closest to the pixel but also by neighbouring lenses $27^{I}$ and $27^{II}$ of the lenticular arrangement 28. This is the origin of the occurrence of repeated cones of views. Pixel $31^{IV}$ for example contributes to viewing cones 29', 29" and 29''' as shown.

Figure 5:
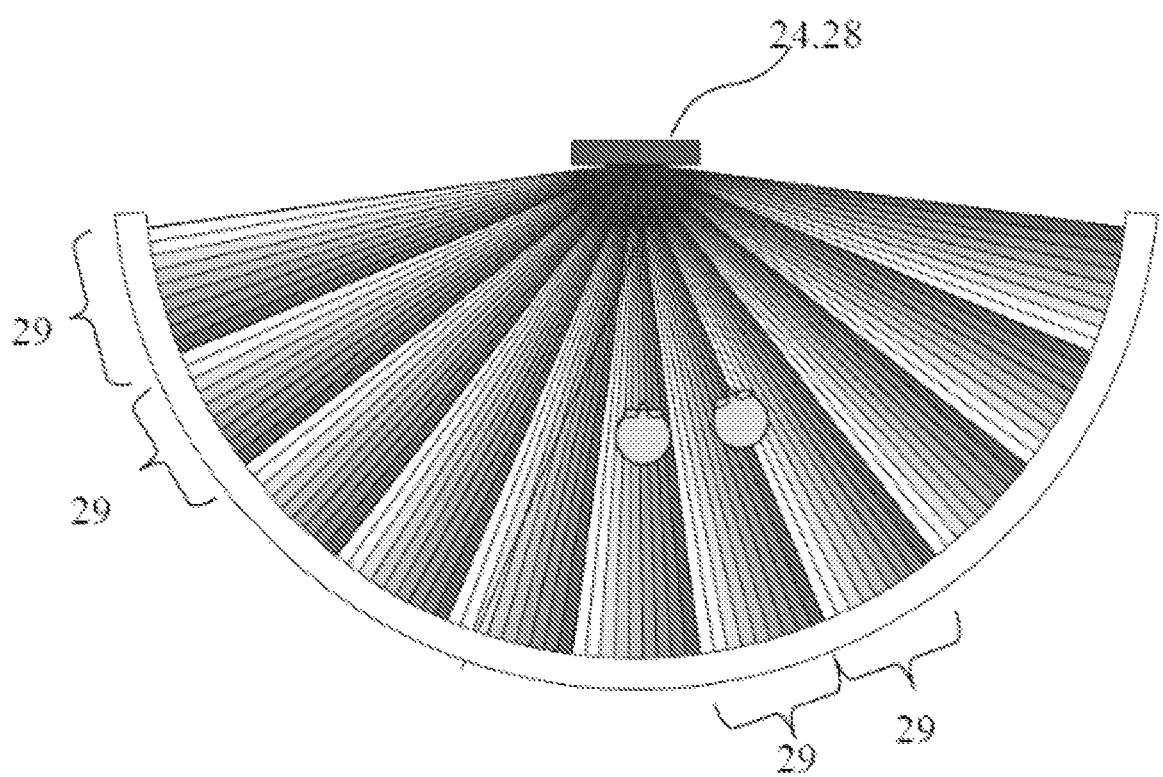
FIG. 5 shows a 9-view system in which the views produced in each of the sets of cones are equal.

The corresponding views produced in each of the cones are equal. This effect is schematically shown in FIG. 5 for a 9-view system (i.e. 9 views in each cone). For an acceptable compromise between 3D effect and resolution penalty, the total number of views is limited to typically 9 or 15. These views have an angular width of typically 1 to 2 degrees. The views and the cones have the property that they are periodic.

There are two basic lenticular designs.

Figure 6:
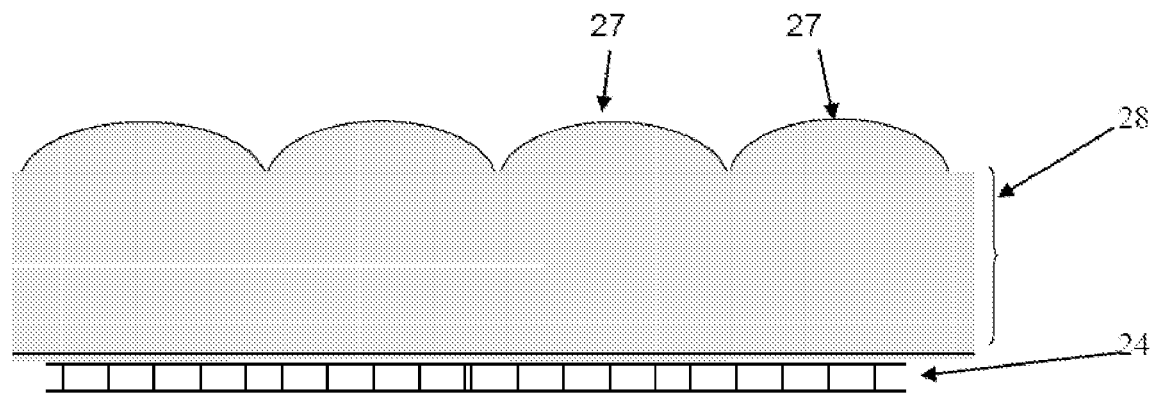
FIG. 6 shows a first way of implementing lenticular lenses.

FIG. 6 shows the least complicated design in which the curved face of the lenticulars 27 of the lenticular array 28 faces away from the display panel 24.

Figure 7:
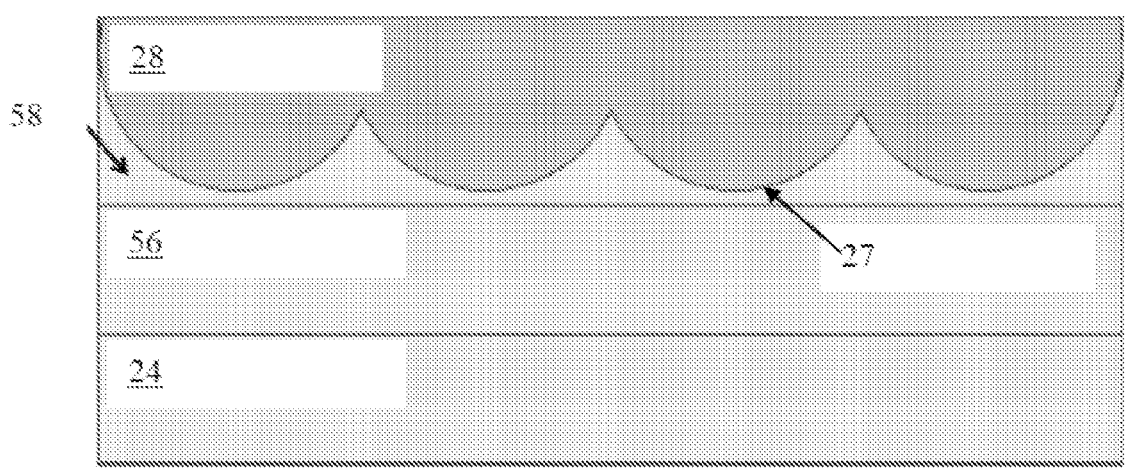
FIG. 7 shows a second way of implementing lenticular lenses; example of display.

FIG. 7 shows an alternative design which has better performance over wide viewing angles. This design is described in detail in WO-2009/147588 and involves the use of a glue (typically a polymer) that has a refractive index that is different from that of the lenticular lens array 28. A glass or polycarbonate slab 56 has a refractive index similar to the glue 58 and is used to create enough distance for the lenticular lens to focus on the display panel. The curved face of the lenticulars of the lenticular array 28 faces towards the display panel 24.

The invention is based on the use of an optical arrangement including elements between the lenses. The arrangement as a whole (not necessarily the parts between the lenses) can be switched to a light transmitting or blocking mode. In this way, light from a pixel that would leave the display from a neighbouring lens can be blocked while the primary viewing cone is unaltered. The invention can be implemented as optical elements between the lenticules and additional layers which provide the control of the light entering/leaving the lenticular lenses so that the light blocking function is enabled or disabled. Various embodiments with varying complexity and light efficiency are possible, such as:

(i) The light blocking structure is a polarizer, and the optical path includes at least one retarder. This is particularly suitable for liquid crystal displays and self-emissive displays with short time-to-markets.
(ii) The light blocking structure is a retarder and the optical path includes a polarizer.
(iii) The light blocking structure is an electrophoretic cell. This may be particularly suitable for future self-emissive displays.

Figure 8:
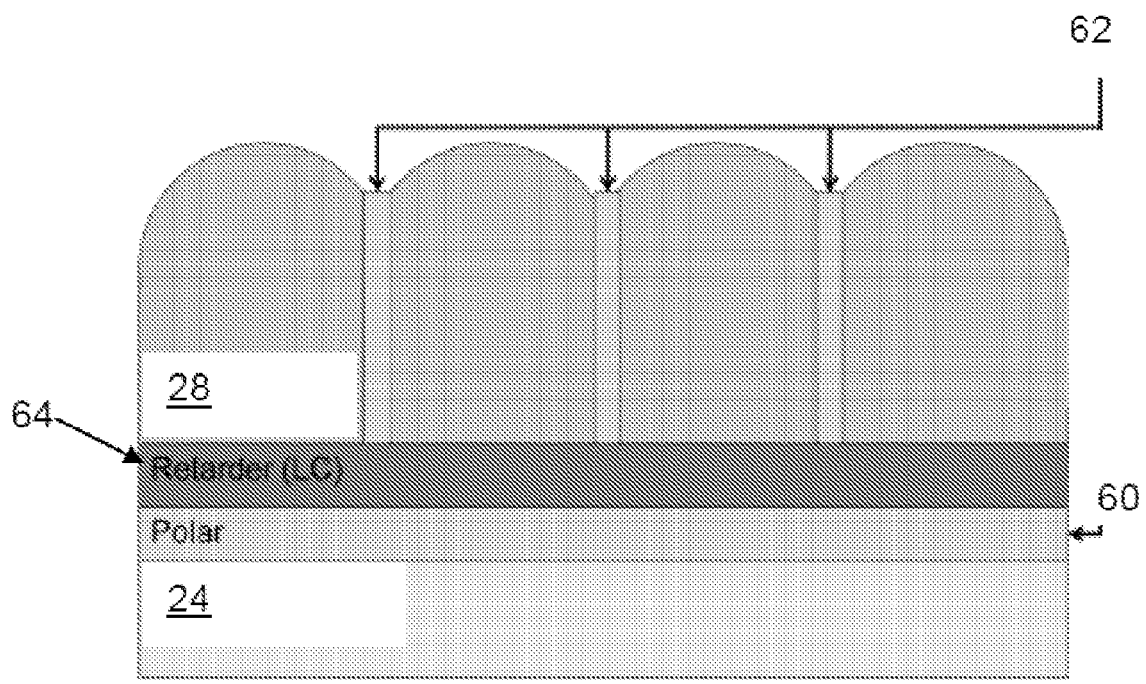
FIG. 8 shows a first example of display device of the invention.

FIG. 8 shows a first embodiment, based on the use of a polarizer as the light blocking element.

A first polarizer 60 is provided between the display panel 24 and the lenticular array 28. An arrangement of second polarizers 62 is provided between the lens elements. An optical retarder 64 is provided between the polarizers 60,62.

The polarizer 60 on top of the display panel 24 is only necessary if the light is not already polarized, so for LCD displays this layer 60 can be removed.

This arrangement is compatible with a regular lenticular sheet (FIG. 6) as well as with the inverted approach (FIG. 7). FIG. 8 shows the application to a lenticular sheet of the type shown in FIG. 6. However, the same approach can be applied to lenticular sheet of the type shown in FIG. 7. In this case, the light blocking polarizers extend through the spacer layer 56 and the glue layer 58 to the lens boundaries.

The lenticular sheet can be manufactured by embossing the lenticular sheet and filling it with material that, when dry, has a polarizing function. An alternative is to produce lenticular and polarizing strips separately and then glue them together to form a lenticular sheet. That sheet can then be placed on top of the other display layers.

The retarder 64 can be a single liquid crystal cell covered on both sides with a single transparent (for example ITO) electrode, such that the retarder as a whole can be switched between polarity states. Alternatively the retarder 64 can be patterned such that an LC cell covers a single sub-pixel, pixel or set of pixels. In that case cells can be switched independently. This allows for content, task or application privacy modes such that sensitive information on the display (for example mail) is only visible in a small viewing cone, while insensitive information is not.

Figure 9:
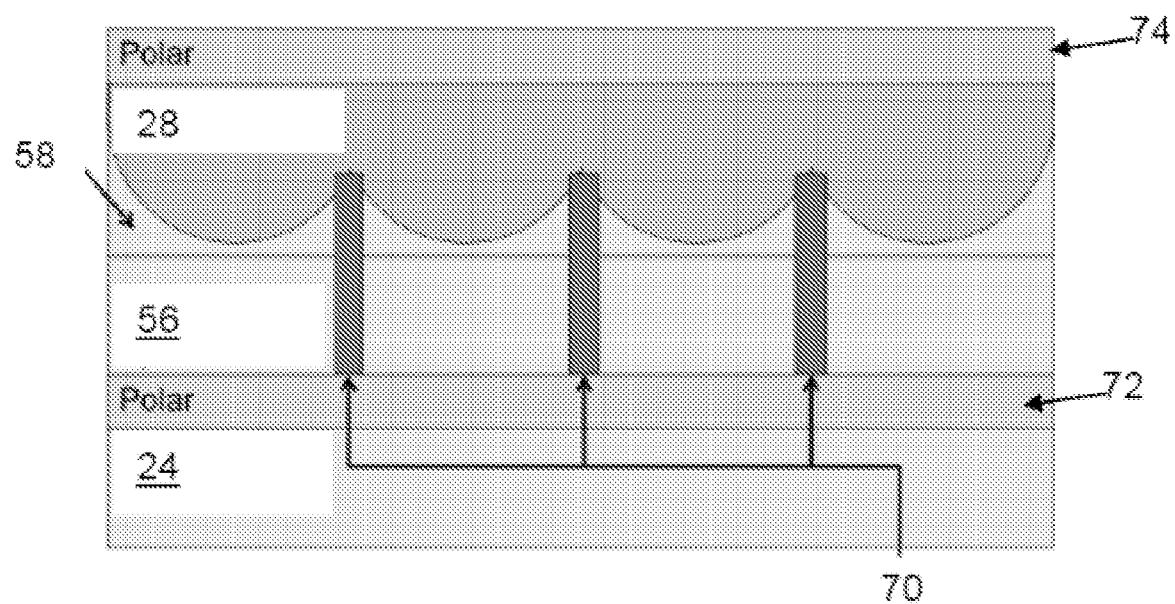
FIG. 9 shows a second example of display device of the invention.

FIG. 9 shows an alternative version in which retarding layers 70 are provided between the lenticular lenses, and a first polarizer 72 is provided between the display panel 24 and the lenticular array 28, and a second polarizer 74 is provided on the output side of the lenticular array. In this way, a switchable retarder is again sandwiched between two polarizers, but the switchable retarder is between the lenses. FIG. 9 shows this approach applied to the type of lens structure of FIG. 7, to show the different position of the vertical blocking elements in comparison to FIG. 6. However, the approach of FIG. 9 can also be applied to the basic lenticular design of FIG. 6.

Liquid crystal displays are inefficient because of absorption in the polarizers and liquid crystal cells. When using an LCD display, the light is already polarized so the two approaches above would not further reduce light efficiency very much. However in the case of self-emissive displays that typically emit light of all polarizations, adding a polarizer at least halves the light output. As intensity has a negative relation with lifetime and battery life this should preferably be avoided.

The inefficiency can be avoided if the optical element does not rely on polarization but instead can be switched between a (mostly) absorbing and (mostly) transmitting state. It is possible to do so by use of electrophoretics.

Figure 10:
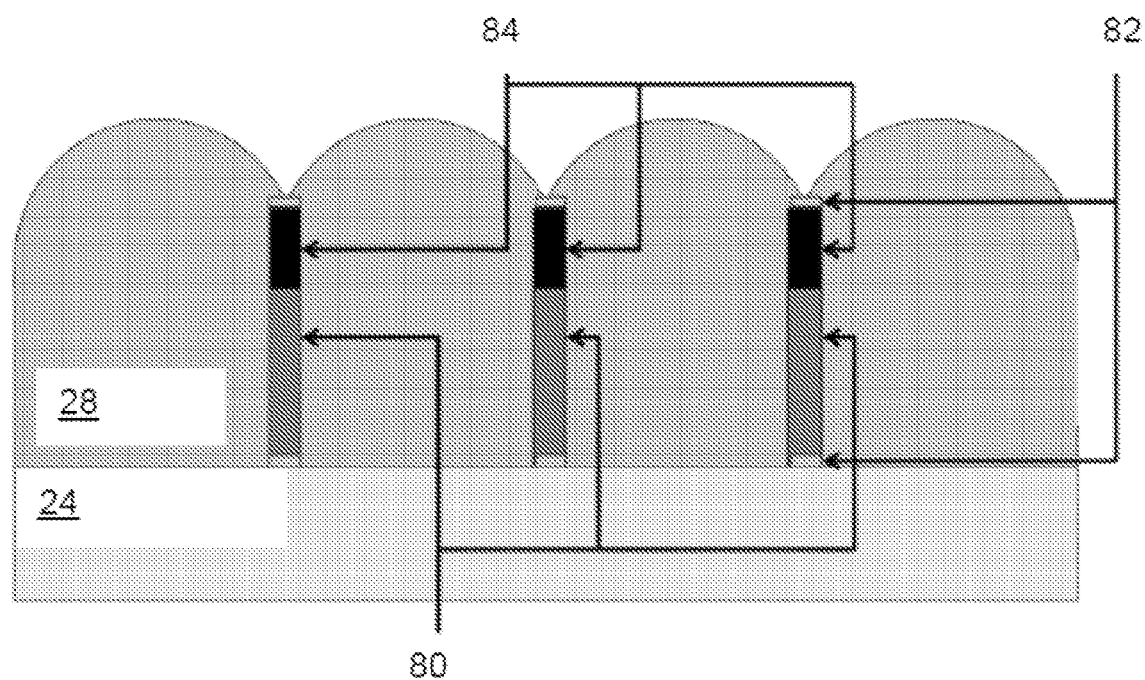
FIG. 10 shows a third example of display device of the invention.

FIG. 10 shows an example in which each optical blocking element consists of a fluid-filled cell 80 containing charged light-absorbing particles. Electrodes 82 above and below the cell allow a voltage to be applied to move all the charged particles to a reservoir 84. This is the public mode. In the natural state the particles are dispersed in the liquid. This is the private mode.

The particle reservoirs 84 can also give the added advantage of reducing crosstalk by blocking total internal reflection which can travel within the lens structure in the manner of a waveguide.

The issue of total internal reflection within the lens structure arises in particular for OLED displays, because the OLED pixels are diffuse emitters that emit light in all directions. For a conventional (2D) display, this is a clear advantage over LCD displays that require a backlight and which, without taking special measures, emit light only in a narrow beam. However, the diffuse emission of the OLED material also poses a challenge as a lot of light is recycled inside the organic layers and is not emitted giving rise to a low efficiency. To improve, this various solutions have been sought to improve the out-coupling of the light out of the OLED.

However this improvement for 2D displays is in fact a problem for 3D autostereoscopic OLED displays. The solutions for increasing the light output cannot be used in autostereoscopic lenticular displays, as the light intended to be emitted from one lenticular lens may be reflected in the glass to a neighbouring lens. This reduces contrast and increases crosstalk.

Thus, there is a conflict between the desire for increased light out-coupling from an OLED panel and the desire for low crosstalk within a 3D autostereoscopic display.

Even when in the public mode, the particle reservoirs can be designed to block the passage of light between lenses to reduce cross talk, but still allow the generation of multiple viewing cones. The extent to which the particle reservoirs extend into the lens structure dictates how much effect they have on reducing the cross talk caused by waveguiding within the lens structure.

The use of a (non switchable) light block for this purpose is discussed in applicant's unpublished international patent application PCT/IB2012/052421 entitled "Autostereoscopic Display Device".

A lenticular autostereoscopic display can make use of different technologies for the display illumination.

For example, a cold cathode fluorescent lamp ("CCFL") backlight typically comprises a row of CCFL lamps placed in a cavity lined with a white and diffuse (Lambertian) back. The light from the CCFL lamps either directly or via the back lining passes through a diffuser to hide the lamps and ensure sufficiently uniform screen intensity.

In one example, the light is collimated using a so-called brightness enhancement foil which is lined with small prisms. To prevent excessive light loss due to polarization, a dual brightness enhancement foil is used which acts as a reflective polarizer. In this way light of the unwanted polarization is returned to the lamps where after diffuse reflection it may re-enter the optical elements. As the dual brightness enhancement foil is a weak polarizer, another polarizer can be used (called the "polar").

The LC panel has colour filters and another polarizer called the "analyser".

All light is blocked by the polar and analyser (the two polarizers), except when a voltage is applied to a liquid crystal cell, in which case the polarization is altered in between the polarizers and as such the light can pass the analyser. Through colour filters the white light emitted from the CCFL lamps is filtered such that colours can be produced.

White LED's can be used to replace the CCFL backlights in order to improve energy efficiency. An additional advantage is that LED's can be turned on and off quickly and thereby allow frame-based local dimming in order to improve the black level and power efficiency. Another step is to use RGB LED's instead of white ones with the benefit that the colour gamut can be increased. The LED's can be placed behind the display panel or on the sides of a patterned waveguide to produce a side-lit display.

Some new emissive techniques, namely organic light emitting diodes (OLED), organic light emitting transistors (OLET) and quantum dot LEDs (QLED), are especially suitable to create backlights as the techniques allow to create a uniformly emitting surface. This removes the need for diffusers and waveguides and thus can reduce the number of components and make the display even thinner.

A backlight can be dispensed with if a direct emitting display technology is used. With an average gray level of 18% in video, 82% of the polarized light is absorbed in an LCD system. All the layers in the screen combined have a transparency of about 7%. So effectively on average only 18% of 7%, which equals 1.6%, of the emitted light leaves the screen.

A display with direct-emissive pixels in contrast only emits the required light and thus even if the finishing would remove half of the light, the display would have 31 times (50% divided by 1.6%) the efficiency of LCD for average content. For white the efficiency would be 7 times (50% divided by 7%) the efficiency of LCD.

Organic light emitting diodes (OLED) and transistors (OLET) and quantum dot LED's (QLED) are new principles to produce efficient and powerful flat emitters of almost any desired shape and size. One option is to use an LCD design with such a backlight. However, to use the full potential of the mentioned techniques, the pixels themselves should be emitters to improve the efficiency.

OLED emitters may be modelled as Lambertian emitters. A Lambertian surface appears equally bright from all angles. The OLED luminance for big surfaces is high enough to allow LCD backlights. Based on the 7% efficiency and a white output of 300 cd/m$^2$, the OLED backlight luminance exceeds 4000 cd/m$^2$. For small emitters a higher brightness should not be an issue.

The invention can be applied to all of these types of display.

The examples above show non-switchable autostereoscopic displays.

By making the lens of a multiview display switchable, it becomes possible to have a high 2D resolution mode in combination with a 3D mode. Other uses of switchable lenses are to increase the number of views time-sequentially (WO-2007/072330) and to allow multiple 3D modes (WO-2007/072289). Known methods to produce a 2D/3D switchable display replace the lenticular lens by:

(i) A lens shaped cavity filled with liquid crystal material of which the lens function is turned on/off by electrodes that control the orientation of LC molecules or is turned on/off by changing the polarization of the light (through a switchable retarder).

(ii) A box shaped cavity filled with liquid crystal where electrodes control the orientation of LC molecules to create a gradient-index lens (see for instance WO-2007/072330).

(iii) An electrowetting lens of droplets of which the shape is controlled by an electric field.

(iv) A lens-shaped cavity filled with transparent electrophoretic particles in a fluid of different refractive index (WO-2008/032248)

This invention can be applied to switchable autostereoscopic displays, for example of the types outlined above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising,
a display panel;
an array of lenses arranged in front of the panel; and
a light blocking arrangement for selectively blocking light which is directed between the lenses,
wherein the light blocking arrangement comprises elements provided between adjacent lens locations;
wherein the autostereoscopic display device is configurable in a privacy mode in which the light blocking arrangement blocks the light which is directed between the lenses, and in a public mode in which the light blocking arrangement does not block the light which is directed between the lenses, and
wherein the light blocking arrangement comprises a switchable retarder arrangement for altering a light polarization and a polarizer arrangement for blocking at least one polarization,
wherein the elements provided between the adjacent lenses comprise the polarizer arrangement, and the switchable retarder arrangement is provided before the lens array.

2. The autostereoscopic display device as claimed in claim 1, wherein the switchable retarder arrangement is pixellated.

3. The autrostereoscopic display device as claimed in claim 1, wherein the switchable retarder arrangement comprises a single switchable component.

4. The autostereoscopic display device as claimed in claim 1, wherein the light blocking arrangement further comprises a second polarizer arrangement, with the switchable retarder arrangement provided between the two polarizer arrangements.

5. The autostereoscopic display device as claimed in claim 1, the display panel comprises a liquid crystal display.

6. The autostereoscopic display device as claimed in claim 1, the display panel comprises a light emissive display.

7. The autrostereoscopic device as claimed in claim 1, wherein the lenses comprise a curved lens portion, wherein the curved lens portion faces away from the display panel and the elements of the light blocking arrangement are in the lens beneath the curved lens portion.

* * * * *